Aug. 13, 1963    L. C. FRIEND    3,100,333
METHOD OF MAKING COMPOUND GEAR
Filed April 22, 1959

INVENTOR
LINDSAY C. FRIEND
BY K. G. Doub
ATTORNEY

United States Patent Office 3,100,333
Patented Aug. 13, 1963

3,100,333
METHOD OF MAKING COMPOUND GEAR
Lindsay C. Friend, Baltimore, Md., assignor to The Bendix Corporation, a corporation of Delaware
Filed Apr. 22, 1959, Ser. No. 808,229
1 Claim. (Cl. 29—159.2)

Compound gears such as those shown in FIGS. 1 and 2 of the drawing are usually made by initially casting or forging a single solid body, then machining to the required size, and cutting or hobbing in the teeth; or by initially forming (as by forging or casting or by cutting from rod stock), the respective gear bodies in separate parts, machining to size, and then joining one gear body to the other by splining, as by forcing a toothed end portion of the small pinion gear body into and through an undersized center hole formed in the other gear body (which may be considered as a spur gear). To ensure against axial displacement, the projecting end of the pinion gear may be upset around the axis of the spur gear. A concentric arrangement is facilitated by hobbing the teeth of the pinion gear before assembly and those of the spur gear after assembly, but this is a matter of choice. If a compound gear made up of a single solid body is to be used in high-precision installations requiring cut teeth, it involves an expensive machining operation, which becomes more difficult when the resulting gear is small or of the miniature type and requires teeth for substantially the full length of the pinion gear; and it may be necessary to machine away expensive metal. On the other hand, if the compound gear is made by joining two separately formed gears, one to the other, machining and scrap costs are reduced but a problem presents itself in joining the gears in a manner such as to withstand torque and axial loading at the point of jointure. Also, if the gears are joined by a tooth-splining operation under relatively great pressure, special jigs or tools may be required to hold the parts in concentric relation.

The primary object of the present invention, therefore, is to provide a simple method of fabricating compound gears which not only reduces the cost of fabrication but also insures a tight and lasting fit at the point of jointure. More specifically, the invention contemplates a method of making compound gears by first fabricating the respective gear bodies or blanks separately and then joining them in a manner such as to, in effect, forge the gear bodies into an integral unit at the point of jointure.

The method will be readily understood in view of the following description taken in conjunction with the drawing, wherein.

Figure 1:
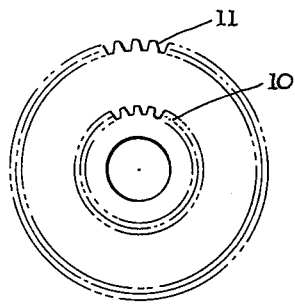
FIGS. 1 and 2 are side and end elevations, respectively, of a compound gear fabricated in accordance with the present method; it consists of a pinion gear joined to a spur gear.
Figure 2:
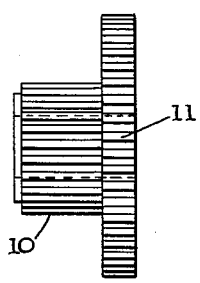
Figure 3:
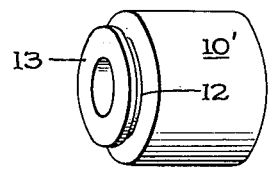
FIG. 3 is a view in perspective of the pinion gear body or blank ready for the tooth-hobbing operation.
Figure 4:
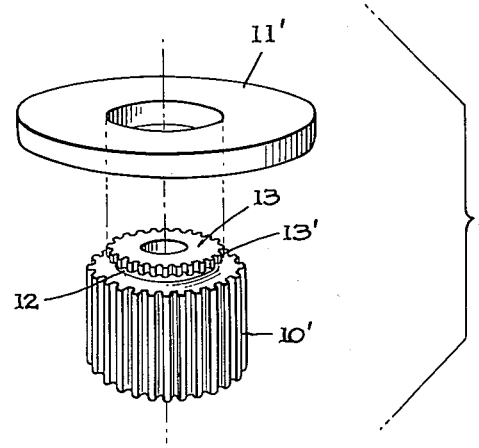
FIG. 4 is a disassembled view of both gear bodies ready for joining.

Referring to the drawing in detail, the pinion gear is indicated at 10 and the spur gear at 11. The blanks for these may be made of any suitable metal or material having the required deformation characteristics. Bronze or steel are commonly used. The operation starts with the making of a body or blank for each gear, which may be done by forging, casting, or cutting from rod stock. The blanks or bodies prior to joining are designated 10' and 11'. FIG. 3 shows the pinion gear body ready for the tooth-hobbing operation; also compare with FIG. 4 which shows the toothed pinion gear ready to be assembled to the spur gear body. Preferably, but not necessarily, the spur gear is not toothed until after the joining operation, since this method facilitates a concentric unit. Note that the one end of the pinion gear body is provided with a diametrically-reduced stepped projection consisting of an undercut annular locking recess 12 and an end guide shoulder or collar 13. The shoulder or collar 13 functions as a guide and centering member when the pinion gear body or blank is positioned in the center hole of the spur gear in preparation for the joining operation. This end projection may be formed in any suitable manner, depending upon whether the blank is cast, forged or cut from rod stock. If cut from rod stock, the reduced end portion 13 and annular groove 12 may be formed by a simple machining operation, otherwise it may be initially cast or forged. The length of the projection, including the collar or shoulder 13 and annular recess 12, is preferably substantially half the thickness of the spur gear 11. However, the diameter and thickness of the collar and/or groove need not be highly precise; the dimensions of the collar may be such as to permit it to move under a reasonable application of force into the hole 14 with sufficient snugness to ensure against play and the depth of the recess need only be sufficient to receive excess metal when the gears are joined as hereinafter explained. During the tooth-hobbing operation, a series of indentations or shallow teeth 13' may also be formed in the periphery of the collar 13. While these are not essential, they do assist in establishing a tight bond at the line of jointure around the center hole of the spur gear.

Figure 5:
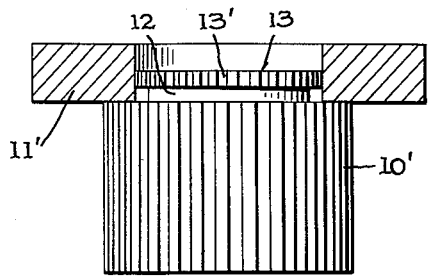
FIG. 5 is a central cross-section of the two gears at the start of the joining operation.
Figure 6:
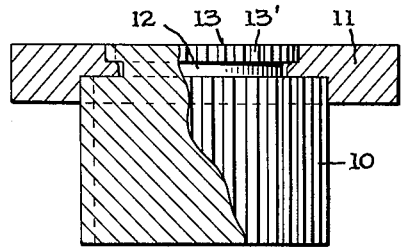
FIG. 6 is a similar view at the completion of the joining operation.

FIG. 5 shows the pinion gear assembled to the spur gear ready for the joining operation. Note that the shoulder or collar 13 centers the pinion gear with respect to the spur gear. The parts may then be put into an arbor press and axial pressure applied until the end of the collar is moved into a plane substantially flush with the outer surface of the spur gear. During this operation, metal is displaced from the adjacent or surrounding axial portion of the spur gear by the advancing flat end surfaces of the pinion teeth and this displaced metal in part enters the undercut or annular recess 12 and in part flows between and, in effect, merges with the teeth 13' of the pinion gear, note FIG. 6. The dimensions of the parts are preferably chosen such that the pinion teeth do not simply cut a splineway but also displace a certain amount of metal as above indicated, causing the metal at the joining area to be "forged" into the recess and the teeth to become embedded in the metal, positively locking the gears against both endwise and angular displacement, without any possibility of the slightest clearance or play at the point of jointure. It will also be observed that the outer end surface of the spur gear comes flush with the end of the collar 13, requiring no machining to attain this result.

Actual experience with compound gears fabricated in this manner has conclusively demonstrated that they possess considerable strength and resistance to relative torsional and axial displacement, and are capable of withstanding loads substantially equivalent to those of a compound gear made from a single solid piece of metal or like material.

What is claimed is:
The method of fabricating a compound gear assembly which consists in performing the following operations:
 forming a first gear body with substantially axial teeth and an axial diametrically reduced projection at one end thereof;
 forming a second gear body with a smooth axial bore, the diameter of which is substantially equal to the diameter of said projection and the axial dimension of which is substantially greater than the axial dimension of said projection;

forming an annular recess at the base of said projection where the teeth of said first gear terminate, leaving an annular guide portion at the outer end of said projection;

and joining said gear bodies one to the other by inserting the axial projection of said first gear into the bore of the second gear and applying sufficient axially-directed pressure to cause the teeth of said first gear to cut a splineway in the metal surrounding the bore of said second gear and at the same time displace metal which in part passes into the said recess and in part substantially merges with the teeth which have been driven into the second gear, said pressure being maintained until the outer end surface of said projection moves into substantially flush relation to the outer surface of said spur gear.

References Cited in the file of this patent
UNITED STATES PATENTS

| | | |
|---|---|---|
| 338,961 | Hart | Mar. 30, 1886 |
| 338,962 | Hart | Mar. 30, 1886 |
| 1,109,900 | Coleman | Sept. 8, 1914 |
| 1,143,558 | Templeton | June 15, 1915 |
| 1,157,666 | Bennett | Oct. 26, 1915 |
| 1,415,542 | Quegel et al. | May 9, 1922 |
| 1,557,522 | Fulper | Oct. 13, 1925 |
| 1,771,432 | Cullman | July 29, 1930 |
| 1,775,055 | Tarhox et al. | Sept. 2, 1930 |
| 1,775,295 | Ronk | Sept. 9, 1930 |
| 2,062,927 | Peterson | Dec. 1, 1936 |
| 2,109,155 | Sekella | Feb. 22, 1938 |
| 2,127,969 | Dingwerth | Aug. 23, 1938 |
| 2,151,435 | Neracher | Mar. 21, 1939 |
| 2,490,594 | Madden | Dec. 6, 1949 |
| 2,755,112 | Klancnik | July 17, 1956 |
| 2,852,843 | Banta et al. | Sept. 23, 1958 |